(12) United States Patent
Butt et al.

(10) Patent No.: US 12,218,514 B2
(45) Date of Patent: Feb. 4, 2025

(54) ENERGY HARVESTING INFORMATION SUPPORTED USER EQUIPMENT SCHEDULING

(71) Applicant: Nokia Technologies Oy, Espoo (FI)

(72) Inventors: Muhammad Majid Butt, Naperville, IL (US); Ahlem Khlass, Massy (FR); Rapeepat Ratasuk, Naperville, IL (US); Nitin Mangalvedhe, Naperville, IL (US); Navin Hathiramani, Dallas, TX (US); Gilsoo Lee, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/362,406

(22) Filed: Jul. 31, 2023

(65) Prior Publication Data
US 2024/0072572 A1  Feb. 29, 2024

(30) Foreign Application Priority Data
Aug. 29, 2022  (FI) ...................... 20225758

(51) Int. Cl.
*H02J 50/05* (2016.01)
*H02J 50/00* (2016.01)
(Continued)

(52) U.S. Cl.
CPC ............ *H02J 50/05* (2016.02); *H02J 50/001* (2020.01); *H02J 50/20* (2016.02); *H02J 50/80* (2016.02)

(58) Field of Classification Search
CPC .................................................. H02J 50/001
See application file for complete search history.

(56) References Cited

U.S. PATENT DOCUMENTS

| 9,899,844 B1 | 2/2018 | Bell et al. |
| 11,540,223 B2 | 12/2022 | Butt et al. |

(Continued)

FOREIGN PATENT DOCUMENTS

| WO | 2014/109797 A1 | 7/2014 |
| WO | 2017/023554 A1 | 2/2017 |

(Continued)

OTHER PUBLICATIONS

"Moderator's summary of Discussion [RAN94e-R18Prep-28] Passive IoT", 3GPP TSG RAN#94e, RP-212688, Agenda: 8A.5, Ericsson, Dec. 6-17, 2021, pp. 1-45.

(Continued)

*Primary Examiner* — Daniel Cavallari
(74) *Attorney, Agent, or Firm* — Nokia Technologies Oy

(57) ABSTRACT

Embodiments of the present disclosure relate to devices, methods, apparatuses and computer readable storage media of energy harvesting information supported User Equipment (UE) scheduling. The method includes reporting, to a network device in the radio network, energy harvesting capability of the terminal device indicating a first energy value ($\Delta E_t$) collected during a first time interval ($\Delta t$) and a second energy value ($E_{Avg}$) averaged over a second time interval; and communicating with the network device to transmit data according to scheduling information received from the network device and determined based on the energy harvesting capability of the terminal device. In this way, the terminal device may be scheduled by the network based on its energy harvesting capability, to maintain a trade-off between harvested energy utilization and fairness in scheduling from Passive IoT UEs.

20 Claims, 5 Drawing Sheets

(51) Int. Cl.
*H02J 50/20* (2016.01)
*H02J 50/80* (2016.01)

(56) References Cited

U.S. PATENT DOCUMENTS

| | | | |
|---|---|---|---|
| 2020/0106292 A1 | 4/2020 | Lee et al. |
| 2021/0297948 A1 | 9/2021 | Wang et al. |
| 2022/0053494 A1 | 2/2022 | Shattil |
| 2022/0070766 A1 | 3/2022 | Haque et al. |
| 2022/0225402 A1 | 7/2022 | Elkotby et al. |
| 2022/0248432 A1 | 8/2022 | Balasubramanian et al. |

FOREIGN PATENT DOCUMENTS

| | | |
|---|---|---|
| WO | 2020/236665 A1 | 11/2020 |
| WO | 2021/154610 A1 | 8/2021 |

OTHER PUBLICATIONS

Ali et al., "Energy Efficient Resource Allocation for M2M Devices in 5G", Sensors, vol. 19, No. 8, 2019, pp. 1-16.
Ku et al., "Advances in Energy Harvesting Communications: Past, Present, and Future Challenges", IEEE Communications Surveys & Tutorials, vol. 18, No. 2, Secondquarter 2016, pp. 1384-1412.
Perera et al., "Simultaneous Wireless Information and Power Transfer (SWIPT): Recent Advances and Future Challenges", IEEE Communications Surveys & Tutorials, vol. 20, No. 1, Firstquarter 2018, pp. 264-302.
Wei et al., "Resource Allocation for Simultaneous Wireless Information and Power Transfer Systems: A Tutorial Overview", Proceedings of the IEEE, vol. 110, No. 1, Jan. 2022, pp. 127-149.
Wang et al., "Long-Term Scheduling and Power Control for Wirelessly Powered Cell-Free IoT", IEEE Internet of Things Journal, vol. 8, No. 1, Jan. 1, 2021, pp. 332-344.
"Discussion on ambient power-enabled IoT", 3GPP TSG-RAN #95-e, RP-220182, Agenda: 9.11, OPPO, Mar. 2022, pp. 1-33.
"IEEE 802.11", Wikipedia, Retrieved on Aug. 1, 2023, Webpage available at : https://en.wikipedia.org/wiki/IEEE_802.11.
Office action received for corresponding Finnish Patent Application No. 20225758, dated Jan. 17, 2023, 14 pages.
Lee et al., "EHLinQ: Distributed Scheduler for D2D Communication With RF Energy Harvesting", IEEE Systems Journal, vol. 14, No. 2, Jun. 2020, pp. 2281-2292.
"New SID: Study on Energy Harvesting enabled Communication Services in 5GS", 3GPP TSG-SA1 Meeting #97e, S1-220118, Agenda: 4, OPPO, Feb. 14-24, 2022, 5 pages.
Office action received for corresponding Finnish Patent Application No. 20225758, dated Jun. 30, 2023, 12 pages.
Extended European Search Report received for corresponding European Patent Application No. 23189560.8, dated Mar. 14, 2023, 6 pages.

ENERGY HARVESTING INFORMATION SUPPORTED USER EQUIPMENT SCHEDULING

RELATED APPLICATION

This application claims priority to FI patent application No. 20225758, filed Aug. 29, 2022, and entitled "ENERGY HARVESTING INFORMATION SUPPORTED USER EQUIPMENT SCHEDULING," which is incorporated herein by reference in its entirety.

FIELD

Embodiments of the present disclosure generally relate to the field of telecommunication and in particular to devices, methods, apparatuses and computer readable storage media of energy harvesting information supported User Equipment (UE) scheduling.

BACKGROUND

Energy Harvesting enabled Communication Services in 5GS, which may also be called as passive Internet of Things (IoTs) have already been widely used in various vertical industries including logistics, manufacture, transportation, energy industry etc.

SUMMARY

In general, example embodiments of the present disclosure provide a solution of energy harvesting information supported UE scheduling.

In a first aspect, there is provided a terminal device. The terminal device includes at least one processor; and at least one memory storing instructions that, when executed by the at least one processor, cause the terminal device at least to report, to a network device in the radio network, energy harvesting capability of the terminal device indicating a first energy value ($\Delta E_t$) collected during a first time interval ($\Delta t$) and a second energy value ($E_{Avg}$) averaged over a second time interval; and communicate with the network device according to scheduling information received from the network device and determined based on the energy harvesting capability of the terminal device.

In a second aspect, there is provided a network device. The network device includes at least one processor; and at least one memory storing instructions that, when executed by the at least one processor, cause the network device at least to receive, from a terminal device, energy harvesting capability of the terminal device indicating a first energy value collected during a first time interval and a second energy value averaged over a second time interval; and allocate, to the terminal device, scheduling information for a communication between the terminal device and the network device at least based on the energy harvesting capability of the terminal device.

In a third aspect, there is provided a method. The method includes reporting, to a network device in the radio network, energy harvesting capability of the terminal device indicating a first energy value ($\Delta E_t$) collected during a first time interval ($\Delta t$) and a second energy value ($E_{Avg}$) averaged over a second time interval; and communicating with the network device to transmit data according to scheduling information received from the network device and determined based on the energy harvesting capability of the terminal device.

In a fourth aspect, there is provide a method. The method includes receiving at a network device, energy harvesting capability of the terminal device indicating a first energy value collected during a first time interval and a second energy value averaged over a second time interval; and allocating, to the terminal device, scheduling information for a communication between the terminal device and the network device at least based on the energy harvesting capability of the terminal device.

In a fifth aspect, there is provided an apparatus includes means for reporting, to a network device in the radio network, energy harvesting capability of the terminal device indicating a first energy value ($\Delta E_t$) collected during a first time interval ($\Delta t$) and a second energy value ($E_{Avg}$) averaged over a second time interval; and means for communicating with the network device to transmit data according to scheduling information received from the network device and determined based on the energy harvesting capability of the terminal device.

In a sixth aspect, there is provided an apparatus includes means for receiving, from a terminal device, energy harvesting capability of the terminal device indicating a first energy value collected during a first time interval and a second energy value averaged over a second time interval; and means for allocating, to the terminal device, scheduling information for a communication between the terminal device and the network device at least based on the energy harvesting capability of the terminal device.

In a seventh aspect, there is provided a computer readable medium having a computer program stored thereon which, when executed by at least one processor of a device, causes the device to carry out the method according to the third aspect or the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings.

Throughout the drawings, the same or similar reference numerals may represent the same or similar element.

DETAILED DESCRIPTION

Figure 1:
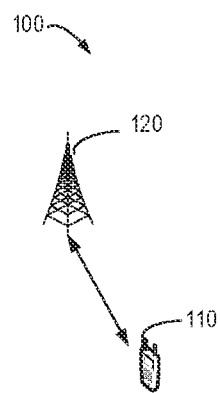
FIG. 1 illustrates an example environment in which example embodiments of the present disclosure may be implemented.

Principle of the present disclosure will now be described with reference to some example embodiments. It may be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein may have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it may not be necessary that every embodiment includes the particular feature, structure, or characteristic. Moreover, such phrases are not necessarily referring to the same embodiment. Further, when a particular feature, structure, or characteristic may be described in connection with an embodiment, it may be submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step may be performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture includes a Centralized Unit (CU) and a Distributed Unit (DU) at an IAB donor node. An IAB node includes a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It may be noted that example embodiments of the present disclosure are equally applicable to other resources in other domains.

FIG. 1 shows an example communication network 100 in which embodiments of the present disclosure may be implemented. As shown in FIG. 1, the communication network 100 may include terminal devices 110-1 and 110-2. Hereinafter the terminal devices 110-1 and 110-2 may also be referred to as UE 110-1 and UE 110-2, respectively, or may also be referred to as a terminal device 110 or a UE 110 collectively.

The communication network 100 may further include a network device 120. Hereinafter the network device 120 may also be referred to as a gNB 120 or a network element 120. The terminal devices 110-1 and 110-2 may communicate with the network device 120 respectively.

It is to be understood that the number of network devices and terminal devices shown in FIG. 1 is given for the purpose of illustration without suggesting any limitations. The communication network 100 may include any suitable number of network devices and terminal devices.

In some example embodiments, links from the second device 120 to the terminal devices 110-1 and 110-2 may be referred to as a downlink (DL), while links from the terminal devices 110-1 and 110-2 to the network device 120 may be referred to as an uplink (UL). In DL, the network device 120 may be a transmitting (TX) device (or a transmitter) and the terminal devices 110-1 and 110-2 are receiving (RX) devices (or receivers). In UL, the terminal devices 110-1 and 110-2 are TX devices (or transmitters) and the network device 120 may be a RX device (or a receiver).

Communications in the communication environment 100 may be implemented according to any proper communication protocol(s), includes, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, includes but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

As described, Energy Harvesting enabled Communication Services in 5th Generation Mobile Communication Technology Service (5GS) have been discussed. Enabling passive IoT devices in both public and private networks may benefit the whole 5G ecosystem.

The study on passive IoT may focus on some aspects such as the operation under extreme environmental conditions (e.g., high pressure, extremely high/low temperature, humid environment, vibration etc.), ultra-low complexity (cost), very small terminal size/form factor (e.g., thickness of mm), maintenance-free and longer life cycle, and the scenarios where a terminal device driven by a battery may not be applicable.

Therefore, support of Passive IoTs using either battery-less terminal device or a terminal device with limited energy storage capability (e.g., using a capacitor), may become a new requirement for the existing 3rd Generation Partnership Project (3GPP) technologies.

A terminal device based on energy harvesting may operate in a passive mode. The terminal device itself may use energy harvested from wireless radio waves or any other form of energy that may be harvested in its particular deployment scenario and may be expected to operate with ultra-low power in the range from tens of microwatts to hundreds of microwatts.

For example, if energy is harvested from wireless radio waves, the output power of energy harvester may be from several micro-walt to tens of micro-walt. If solar panel is used for energy harvesting from solar/light, the output power may be less than 1 milli-walt due to the small size of the solar panel. The values of energy harvested from RF source may be associated with source power, frequency, and distance.

The implementation of the energy harvesting from the RF source may be achieved by using a separate circuit, which may be independent of TX/RX circuits for the device, for example the terminal device. Energy harvested by using this circuit may be stored in a battery for TX/RX operations if battery is available or stored in a capacitor temporarily.

For example, the design for the implementation of the energy harvesting may target on multiple aspects listed as below:

Improved link budget compared to existing Radio Frequency Identification (RFID) solutions Frequency bands for global usability Licensed and unlicensed?

Ultra-low cost (e.g., $0.02-$0.5)

No need for battery charging or replacement (enabling low maintenance long life cycle operation)

Ultra-low power (e.g., <100 micro-Watts, to enable operation with back-scattering or energy harvesting)

Small device size, form-factor

Positioning accuracy (e.g., 3-5 m)

Data rate (e.g., 10-100 kbps)

Energy source:

Passive devices: use of backscattering techniques

Semi-passive devices: Devices operating with energy harvesting or with a very small battery (e.g., <100 mAh)

Mobile originated and mobile terminated data

Therefore, the transmission schemes adapted for the Passive IoT devices may need to be further discussed, because besides buffered data based scheduling metrics used in UE scheduling, the Passive IoT UEs need to account for intermittently available energy as well. For example, two energy-dependent metrics may be used in a UE scheduling algorithm in combination with buffered-data based metrics, namely large amount of stored energy or a specified amount of harvested energy per time interval, which may prioritize UEs with largest harvesting capabilities, and lack of stored energy, which may prioritize UEs with small residual energy.

The first metric, i.e., large amount of stored energy may prioritize UEs that harvest more energy and can make good use of scheduling opportunity, but a scenario of Passive IoT use cases may not target applications with large data rates. The second metric, i.e., lack of stored energy, may prioritize IoTs with small amount of stored energy, but many of those UEs may not be able to complete data transmission because of lack of stored energy and scheduling opportunities may be wasted.

Furthermore, there may be a potential risk in achieving fairness among UEs in both approaches. In fact, same UEs may always be scheduled repeatedly as their harvesting capabilities depend on their energy source and their geolocation, particularly when UEs are static or have low mobility. For example, if a UE is in more sun light or close to RF energy transmit source, it may harvest more energy.

Therefore, a solution for scheduling the UEs to maintain a trade-off between harvested energy utilization, which varies over time, and fairness in scheduling/data collection from Passive IoT UEs is to be discussed.

According to some example embodiments of the present disclosure, there is provided a solution for energy harvesting information supported UE scheduling. In this solution, the terminal device reports its energy harvesting capability to the network device. The energy harvesting capability may indicate a first energy value collected during a first time interval and a second energy value averaged over a second time interval. The network device may provide scheduling information for a communication between the terminal device and the network device at least based on the energy harvesting capability of the terminal device. The terminal device may then communicate (e.g., transmit data, capability profile information or report energy harvesting capability) with the network device according to scheduling information. In this way, the terminal device may be scheduled by the network based on its energy harvesting capability, to maintain a trade-off between harvested energy utilization and fairness in scheduling from Passive IoT UEs.

Example embodiments of the present disclosure will be described in detail below with reference to the accompanying drawings.

Figure 2:
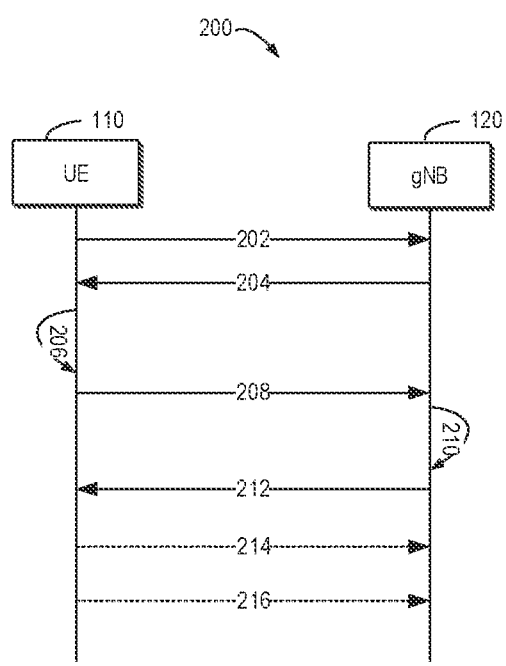
FIG. 2 shows a signaling chart illustrating a process of energy harvesting information supported UE scheduling according to some example embodiments of the present disclosure.

Reference is now made to FIG. 2, which shows a signaling chart 200 for communication according to some example embodiments of the present disclosure. As shown in FIG. 2, the signaling chart 200 involves a UE 110 (i.e., a user equipment or a terminal device), and a gNB 120 (i.e., a network device or a base station). For the purpose of discussion, reference is made to FIG. 1 to describe the signaling chart 200. Although a single UE 110 is illustrated in FIG. 2, it would be appreciated that there may be a plurality of UEs performing similar operations as described with respect to the UE 110 below.

As shown in FIG. 2, the UE 110, for example a passive IoT UE, may provide (step 202) its capability profile information to the gNB 120.

Based on the capability profile information of the UE 110, the gNB 120 may determine configuration information indicative of one or more parameters associated with the energy harvesting of the UE 110 and transmit (step 204) the same to the UE 110. For example, the parameters may include multiple time intervals for the UE to harvest the energy. As an example, the gNB 120 may configure two time intervals for the UE to harvest the energy, namely a first time interval and a second time interval. The first time interval may refer to a short time interval and the second time interval may be longer than the first time interval. For example, the length of the second time interval may be N times the length of the first time interval. The configuration information may indicate the first and the second time intervals explicitly. It is also possible that the configuration information may only indicate a reference time interval (e.g., $\Delta t$), i.e., a short time interval and indicate one or more other time intervals implicitly, for example by indicating a numerical value (e.g., N times) relative to the first time interval.

Furthermore, the parameter associated with the energy harvesting of the UE 110 included in the configuration information may also include a minimum energy threshold T and a minimum reporting period K for reporting the calculated energy value(s) associated with the energy harvesting of the UE 110. The parameter associated with the energy harvesting of the UE 110 included in the configuration information may also refer to a minimum time period (e.g., M slots) subsequent to a successful data transmission, wherein the terminal device does not transmit harvested energy status after it gets scheduled.

The UE 110 may harvest the energy and calculate (step 206) the corresponding energy values based on the configuration information associated with the energy harvesting of the UE 110 received from the gNB 120.

The calculated energy values may include an instantaneous energy value, which may also be referred to as a first energy value in the present disclosure and an average energy, which may also be referred to as a second energy value in the present disclosure. For example, the first energy value may represent energy harvested within a predetermined time interval, such as the first time interval indicated in the configuration information associated with the energy harvesting of the UE 110. The second energy value may represent energy averaged over another time interval longer than the first time interval such as the second indicated in the configuration information associated with the energy harvesting of the UE 110. For example, the length of the second time interval may be N times the length of the first time interval.

For example, the first energy value $\Delta E_t$ may be defined as:

$$\Delta E_t = E2 - E1 \quad (1)$$

where E2 represents the total energy harvested by or an energy level of the UE 110 at a time point t2 and the E1 represents the total energy harvested by or the energy level of the UE 110 at a time point t1. The time point t1 is prior to the time point t2 and the interval between the time point t1 and the time point t2 may be equal to the first time interval $\Delta t$.

For example, the second energy value $E_{Avg}$ may be defined as:

$$E_{Avg} = \frac{1}{N} \Sigma_{i=t-N}^{t} \Delta E_i \quad (2)$$

where the $\Delta E_i$ is the energy collected in a short time interval (i.e., the first time interval $\Delta t$) as measured at time instant i. The $E_{Avg}$ represents the collected energy value averaged over N short time intervals $\Delta t$.

Figure 3:
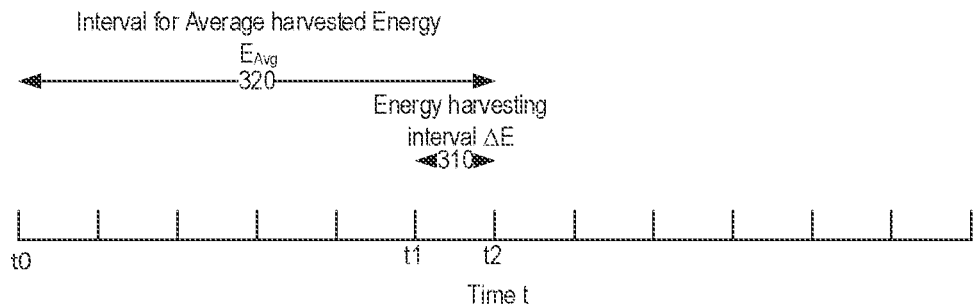
FIG. 3 shows a diagram of time intervals to compute instantaneous energy and average harvested energy according to some example embodiments of the present disclosure.

An example of using time intervals to compute the instantaneous energy and average harvested energy may be shown in FIG. 3. As shown, the first energy value $\Delta E_t$ may be referred to as the energy harvested during the time between points t1 and t2 (interval $\Delta t$), which is shown as the first time interval 310, while the second energy value $E_{Avg}$ may be referred to the harvested energy averaged over the second time interval 320, which starts from time point t0 to time point t2. In implementation, the second time interval 320 may be an absolute value in time units or a multiple of the first time interval (N) (e.g., a value equivalent to N×$\Delta t$).

In an example, the UE 110 may report (step 208) to the gNB 120 its energy harvesting capability indicative of the first energy value $\Delta E_t$ and the second energy value $E_{Avg}$. The report of the energy harvesting capability may be transmitted from the UE 110 to the gNB 120 via Radio Resource Control (RRC) signaling. It is to be understood that the report of the energy harvesting capability may also be transmitted from the UE 110 to the gNB 120 via other suitable signaling, for example, via the physical uplink control channel.

To maintain fairness of UE scheduling, the UE 110 may report the energy harvesting capability indicative of the first energy value $\Delta E_t$ and the second energy value $E_{Avg}$ only some conditions are met. For example, some of the conditions may include whether an amount of data stored in a buffer of the UE 110 which may be ready to be transmitted or whether the first energy value reaches or exceeds the minimum energy threshold T, which may be indicated in the configuration information received from the gNB 120. For example, if the UE 110 has data in the buffer to be transmitted, the UE 110 may determine whether a random access procedure or Small data transmission (SDT) is allowed to be initiated based on the current harvested energy level. If the current harvested energy level is not lower than the minimum energy threshold T, the random access procedure or small data transmission (SDT) may be allowed to be initiated from the UE 110.

The conditions may also include whether the UE 110 has not been previously barred from sending a scheduling request. That is, the UE 110 may be allowed to transmit the report only if the transmission is not to be performed within predefined slots (for example the minimum time period (i.e., M slots)) subsequent to a successful data transmission, or after it was previously scheduled in a last time duration. Furthermore, the conditions may also include whether the UE 110 has previously reported its energy harvesting capability in the last K time intervals (i.e., a minimum reporting period K). If the UE 110 has not reported its energy harvesting capability in the last K time intervals, the UE 110 may be allowed to transmit the report of energy harvesting capability.

In some embodiments, the first and second energy values may be indicated in the report of energy harvesting capability explicitly. In some embodiments, the first and second energy values may be indicated in the report of energy harvesting capability implicitly, for example by indices associated with different energy values/levels. For example, the UE 110 may obtain a mapping between different energy values/levels and respective indices. After the first and second energy values are calculated, the UE 110 may use the mapping to determine respective index to correspond to the first and second energy values. In this way, the information bits in the report may be reduced.

Alternatively, the UE 110 mays also use one bit of information to indicate the first energy value and/or the second energy value. For example, the value of 0 or 1 may indicate that the current $\Delta E_i$ is lower or higher than the previous $\Delta E_{i'}$ where i'<i, and the gNB 120 may interpret the one-bit report to estimate the value of $\Delta E_i$.

Alternatively or optionally, the UE 110 may also report its buffer status report on the amount of data to be transmitted along with the report of energy harvesting capability.

Based on the reported energy harvesting capability, the gNB 120 may determine (step 210) the scheduling priority and scheduling information to schedule a transmission from/to the UE 110. Hereinafter the scheduling information may include one or more uplink scheduling grants and/or one or more downlink scheduling grants. The one or more uplink scheduling grants and the one or more downlink scheduling grants may also be referred to as one or more scheduling grants collectively in the present disclosure.

The gNB 120 may determine the one or more scheduling grants for the UE 110 based on a scheduling priority (SP) metric, which may be determined based on the reported energy harvesting capability, for example, the first and second energy values indicated by the energy harvesting capability.

For example, the scheduling priority (SP) metric may be defined by $$SP = \frac{(\Delta E_t)^{w1}}{(E_{Avg})^{w2}} \quad (3)$$

where, $0 \leq w1 \leq 1$ and $0 \leq w2 \leq 1$ represent internal weighting parameters to control relative weightage of the first and the second energy values and $\Delta E_t$ and $E_{Avg}$ represent first and the second energy values, respectively. For instance, if w1>>w2, the scheduler weighs instantaneous energy higher as compared to history of energy harvesting.

The SP may be determined based on the following rules as an illustration. For example, if a large amount of energy is harvested instantaneously as compared to average energy in longer interval in the past (e.g., $\Delta E_t >> E_{Avg}$), the UE must be used (may be considered as priority 1) because there is no guarantee about amount of energy in future. If small energy is harvested instantaneously, but average energy is not large (e.g., $\Delta E_t$<a threshold value and $E_{Avg}$<a threshold value), the UE may also need to be selected (may be considered as priority 2) because there is no guarantee that more energy can be harvested in future. If large energy is harvested instantaneously and average energy is large (e.g., $\Delta E_t >$a threshold value and $E_{Avg} >$a threshold value), the UE can be selected (may be considered as priority 3) to avoid energy waste. If small energy is harvested instantaneously but average is large (e.g., $\Delta E_t < E_{Avg}$), this implies there is no high priority for the UE (may be considered as priority 4) as it can be scheduled later and still expected to have some energy. The above priorities may be re-configured based on the circumstances.

Furthermore, although the SP is mainly configured for the energy harvesting capability of the UE, it is to be understood that a baseline scheduling priority value may also be configured in the scheduler for non-energy harvesting UE, where the baseline scheduling priority value may be UE-specific. For example, the baseline scheduling priority value may be based on the priority of a non-energy harvesting UE over an energy harvesting UE e.g., an Enhance Mobile Broadband (eMBB) UE may be prioritized over energy harvesting IoT UE.

Based on the determined SP, the gNB 120 may allocate one or more scheduling grants for the UE 110 and transmit the allocated one or more scheduling grants (step 212), for example, in the scheduling information, to the UE 110. It is to be understood that once a UE is scheduled, its priority is reset to zero for next predefined number (e.g., M sent as part of initial configuration) of scheduling slots to give chance to other UEs.

In some embodiments, the one or more scheduling grants may be provided to UE 110 via an RRC connection resume/setup signalling when the UE 110 is in RRC inactive/idle state. If the UE 110 in RRC connected state, the gNB 120 may configure one or more scheduling grants to be used by the UE 110. With one or more scheduling grants scheduled to the UE 110, the chance of having enough available energy harvesting on the one or more scheduling grants may be maximized for the UE 110.

Then the UE 110 may attempt/reattempt data transmission on the one or more scheduling grants (for example, in a case where the one or more scheduling grants refer to the one or more uplink scheduling grants). For example, in case if the UE 110 determines that the current energy harvested by the UE 110 satisfies an energy threshold value required for at least one uplink scheduling grant, the UE 110 may perform the data transmission (step 214) using the at least one uplink scheduling grant.

In case if current energy harvested by the UE 110 does not satisfy an energy threshold value required for an uplink scheduling grant, at the start or in the middle of a data transmission in this uplink scheduling grant, the UE 110 may either abandon the transmission and re-attempts data transmission on the next uplink scheduling grant. That is, if the current energy harvested by the UE 110 satisfies the energy threshold value required for the next uplink scheduling grant, the UE 110 may reattempt transmission by performing the data transmission (step 214) using the next uplink scheduling grant.

If no uplink scheduling grant in the one or more uplink scheduling grants can be used by the UE 110 due to the low energy harvesting value of the UE 110, the UE 110 may request (step 216) subsequent new scheduled grant(s).

However, if the data transmission is successfully received, for example, by the gNB 120, any remaining uplink scheduling grant(s) for the UE 110 may be cancelled.

Furthermore, to adapt for downlink scheduling, the gNB 120 may transmit a request to the UE 110 for its energy harvesting capability (e.g., the first energy value $\Delta E$ and the second energy value $E_{Avg}$). The UE 110 may only report its energy harvesting capability if its collected energy is greater than the estimated required energy for reception. Similarly, if the gNB 120 obtains the energy harvesting capability of the UE 110, the gNB 120 may also allocate one or more downlink scheduling grants based on the energy harvesting capability of the UE 110.

In this way, the UE may be scheduled by the gNB based on its energy harvesting capability, to maintain a trade-off between harvested energy utilization and fairness in scheduling from Passive IoT UEs.

Figure 4:
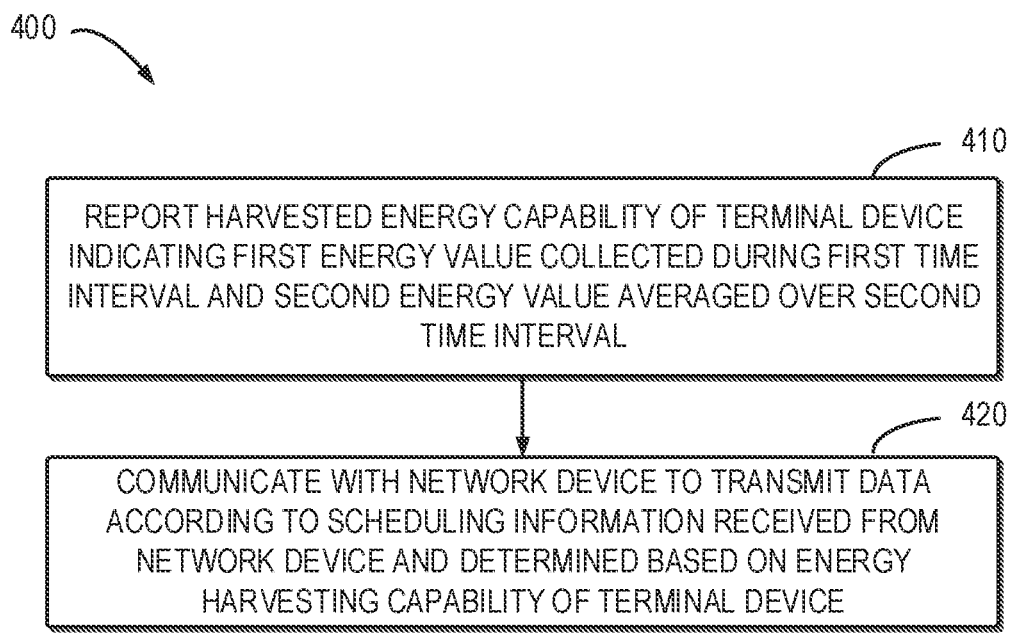
FIG. 4 shows a flowchart of an example method of energy harvesting information supported UE scheduling according to some example embodiments of the present disclosure.

FIG. 4 shows a flowchart of an example method 400 of energy harvesting information supported UE scheduling according to some example embodiments of the present disclosure. The method 400 may be implemented at the terminal device 110 as shown in FIG. 1. For the purpose of discussion, the method 400 will be described conjunctively by referencing to FIG. 1.

At 410, the terminal device 110 report, to a network device in the radio network, energy harvesting capability of the terminal device indicating a first energy value ($\Delta E_t$) collected during a first time interval ($\Delta t$) and a second energy value ($E_{Avg}$) averaged over a second time interval (e.g., N*$\Delta t$) (step 206 in FIG. 2).

In some example embodiments, the scheduling information includes one or more uplink scheduling grants or one or more downlink scheduling grants.

In some example embodiments, the second time interval is longer than the first time interval. In some example embodiments, the length of the second time interval may be N times the length of the first time interval.

In some example embodiments, the first energy value ($\Delta E_t$) may be an instantaneous energy value collected within the first time interval ($\Delta t$). The second energy value ($E_{Avg}$) may be an average energy averaged over the second time interval (e.g., N$\Delta t$).

In some example embodiments, the terminal device 110 may receive configuration information from the network device (step 204 in FIG. 2) and determine the first energy value ($\Delta E_t$) and the second energy value ($E_{Avg}$) using the configuration information (step 206 in FIG. 2).

In some example embodiments, the terminal device 110 may transmit, capabilities profile information to the network device, prior to receiving the configuration information (step 202 in FIG. 2).

In some example embodiments, the configuration information includes at least one of the first time interval ($\Delta t$), the second time interval (e.g., N*$\Delta t$), indicated as an absolute time interval or multiples of the first time interval, the energy threshold (T) value, a threshold period (K) between reporting instances or a minimum time period (M) subsequent to a successful data transmission, wherein the terminal device does not transmit harvested energy status after it gets scheduled.

In some example embodiments, the terminal device 110 may report the energy harvesting capability of the terminal device if at least one or a combination of the following conditions are met: the an amount of data stored in a buffer is ready to be transmitted from the terminal device, the first energy value exceeds the energy threshold value, the terminal device has not been barred from scheduling request for the minimum time period (M), and the terminal device has not previously reported the energy harvesting capability at least in the last threshold period (K) (step 208 in FIG. 2).

In some example embodiments, the terminal device 110 may report the harvested energy capability to the network device via a radio resource control (RRC) signaling (step 208 in FIG. 2).

In some example embodiments, the terminal device 110 may indicate the first and the second energy values explicitly.

In some example embodiments, the terminal device 110 may indicate the first and the second energy values implicitly. For example, the terminal device 110 may obtain a mapping using indices to indicate respective energy values; and report the energy harvesting capability with corresponding indices to the first and the second energy values.

As another example, the terminal device 110 may compare the first energy value with a reference energy value previously received by the terminal device during the first time interval; and report the energy harvesting capability based on a parameter value associated with a comparison result.

In some example embodiments, the terminal device 110 may also report its buffer status report along with the report of energy harvesting capability.

In some example embodiments, the terminal device 110 may determine whether harvested energy at the terminal device satisfies an energy threshold value required for a reception of data transmission from the network device if a request for the energy harvesting capability from the network device is received. The terminal device may report the energy harvesting capability if the harvested energy at terminal device satisfies the energy threshold value.

In some example embodiments, the terminal device 110 may receive scheduling information from the network device, which may indicate one or more scheduling grants (step 212 in FIG. 2). The scheduling information may be determined by the network device based on the energy harvesting capability of the terminal device 110 (step 210 in FIG. 2). In some example embodiments, the scheduling information may include one or more uplink scheduling grants or one or more downlink scheduling grants.

At 420, the terminal device 110 communicates with the network device according to scheduling information received from the network device and determined based on the energy harvesting capability of the terminal device (step 214 or 216 in FIG. 2).

In some example embodiments, the terminal device 110 may perform the data transmission using an uplink scheduling grant in the one or more uplink scheduling grants, if the harvested energy at the terminal device satisfies an energy threshold value required for the data transmission using uplink scheduling grant. (step 214 in FIG. 2).

In some example embodiments, the terminal device 110 may abandon the data transmission on the uplink scheduling grant if the harvested energy does not satisfy the energy threshold value required for transmission using the uplink scheduling grant, and the terminal device 110 may reattempt transmitting the data on a subsequent uplink scheduling grant in the one or more uplink scheduling grants if a further determination that the harvested energy satisfies the energy threshold value required for transmission using the subsequent uplink scheduling grant (step 214 in FIG. 2).

In some example embodiments, the terminal device 110 may transmit, to the network device, a request for a re-allocation of uplink scheduling grants if the energy threshold value does not satisfy respective energy threshold values required for transmission using the one or more uplink scheduling grants (step 216 in FIG. 2).

Figure 5:
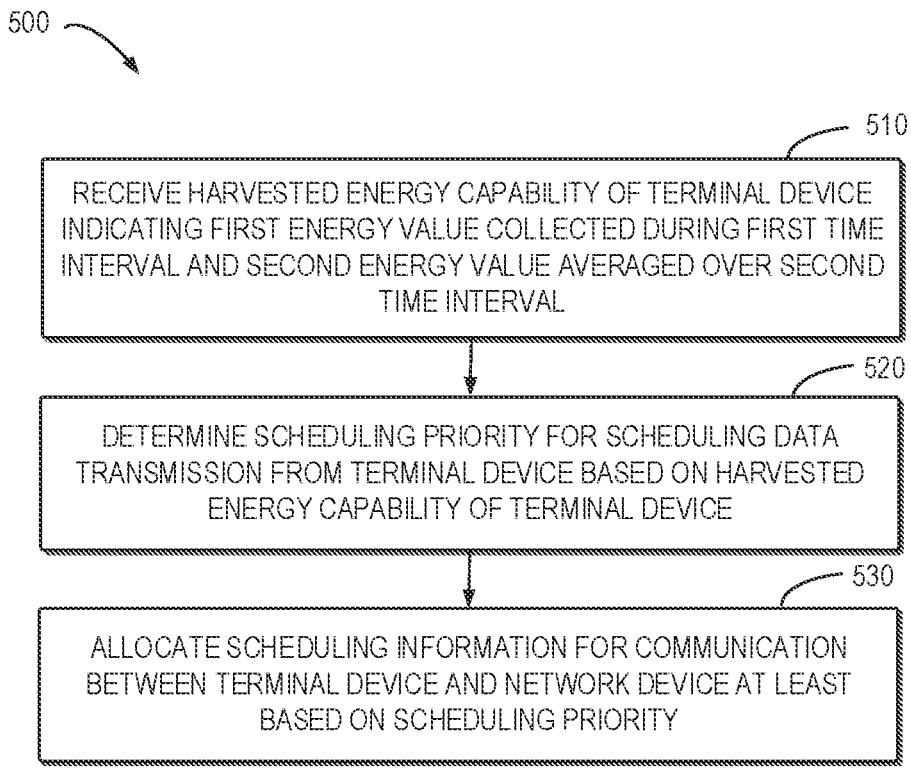
FIG. 5 shows a flowchart of an example method of energy harvesting information supported UE scheduling according to some example embodiments of the present disclosure.

FIG. 5 shows a flowchart of an example method 500 of energy harvesting information supported UE scheduling according to some example embodiments of the present disclosure. The method 500 may be implemented at the network device 120 as shown in FIG. 1. For the purpose of discussion, the method 500 will be described with reference to FIG. 1.

In some example embodiments, the network device 120 may receive capability profile information of the terminal device 110 (step 202 in FIG. 2).

In some example embodiments, the network device 120 may transmit, to the terminal device, configuration information for the terminal device to compute the first and the second energy values (step 204 in FIG. 2).

In some example embodiments, the configuration information includes at least one of the first time interval ($\Delta t$), the second time interval (e.g., $N*\Delta t$), indicated as one of at least an absolute time interval or a value (e.g. N) relative to the first time interval, the energy threshold (T) value, or a threshold period (K) between reporting instances or a minimum time period (M) subsequent to a successful data transmission, wherein the terminal device does not transmit harvested energy status after it gets scheduled.

For example, the parameters may include multiple time intervals for the terminal device to harvest the energy. As an example, the network device 120 may configure two time intervals for the UE to harvest the energy, namely a first time interval and a second time interval. The first time interval may refer to a short time interval and the second time interval may be longer than the first time interval.

In some example embodiments, the second time interval is longer than the first time interval. For example, the length of the second time interval may be N times the length of the first time interval.

The configuration information may indicate the first and the second time intervals explicitly. It is also possible that the configuration information may only indicate a reference time interval (e.g., $\Delta t$), i.e., a short time interval and indicate one or more other time intervals implicitly, for example by indicating a numerical value (e.g., N times) relative to the first time interval.

At 510, the network device 120 receives, from a terminal device, energy harvesting capability of the terminal device indicating a first energy value ($\Delta E_t$) collected during a first time interval ($\Delta t$) and a second energy value ($E_{Avg}$) averaged over a second time interval (e.g., $N*\Delta t$) (step 208 in FIG. 2).

In some example embodiments, the first energy value may be an instantaneous energy value collected within the first time interval ($\Delta t$). The second energy value may be an average energy averaged over the second time interval (e.g., $N\Delta t$).

In some example embodiments, the network device 120 may receive the energy harvesting capability via a radio resource control signaling.

In some example embodiments, the first and the second energy values may be indicated, for example, the network device 120 may obtain, from the energy harvesting capability, indices corresponding to the first and the second energy values; and determine the first and the second energy values based on the indices and a mapping using indices to indicate respective energy values.

As another example, the network device 120 may obtain, from the energy harvesting information, a parameter value a parameter value associated with a comparison result between the first energy value with a reference energy value previously collected by the terminal device during the first time interval; and determine the first energy value based on the parameter value associated with the comparison.

At 520, the network device 120 determines a scheduling priority for scheduling data transmission from the terminal device 110 based on the energy harvesting capability of the terminal device, for example, the first and the second energy values (for example, based on the Equation (3) (step 210 in FIG. 2).

At 530, the network device 120 allocates, to the terminal device 110, scheduling information for a communication between the terminal device and the network device at least based on the scheduling priority, which is determined by the network device 120 based on the energy harvesting capability of the terminal device (step 212 in FIG. 2).

In some example embodiments, wherein the scheduling priority is determined by the network device based on weighted first and second energy values. The first and the second energy value may be weighted by respective weight control factors for the first and the second energy values.

In some example embodiments, the scheduling priority may be determined based on the following:

$$SP = \frac{(\Delta E_t)^{w1}}{(E_{Avg})^{w2}} \quad (3)$$

where, $0 \leq w1 \leq 1$ and $0 \leq w2 \leq 1$ represent internal weighting parameters to control relative weightage of the first and the second energy values and $\Delta E_t$ and $E_{Avg}$ represent first and the second energy values, respectively.

In some example embodiments, the scheduling information includes one or more uplink scheduling grants or one or more downlink scheduling grants.

In some example embodiments, the network device 120 may receive, from the terminal device an amount of data stored in a buffer of the terminal device; or a request for a re-allocation of uplink scheduling grants (step 214 or 216 in FIG. 2).

In some example embodiments, the network device 120 may transmit a request for the energy harvesting capability to the terminal device; and determine one or more downlink scheduling grants for data transmission from the network device based on the energy harvesting capability received from the terminal device.

In some example embodiments, an apparatus capable of performing the method 400 (for example, implemented at the terminal device 110) may include means for performing the respective steps of the method 400. The means may be implemented in any suitable form. For example, the means may be implemented in a circuitry or software module.

In some example embodiments, the apparatus includes means for reporting, to a network device in the radio network, harvested energy capability of the terminal device indicating a first energy value ($\Delta E_t$) collected during a first time interval ($\Delta t$) and a second energy value $E_{Avg}$ averaged over a second time interval; and means for communicating with the network device according to scheduling information received from the network device and determined based on the energy harvesting capability of the terminal device.

In some example embodiments, the scheduling information includes one or more uplink scheduling grants or one or more downlink scheduling grants.

In some example embodiments, the second time interval is longer than the first time interval.

In some example embodiments, the apparatus may further include means for receiving configuration information from the network device and determine the first energy value ($\Delta E_t$) and the second energy value ($E_{Avg}$) using the configuration information.

In some example embodiments, the apparatus may further include means for transmitting, capabilities profile information to the network device, prior to receiving the configuration information.

In some example embodiments, the configuration information includes at least one of the first time interval ($\Delta t$), the second time interval (e.g., N*$\Delta t$), indicated as one of at least an absolute time interval or a value (e.g. N) relative to the first time interval, the energy threshold (T) value, a threshold period (K) between reporting instances or a minimum time period (M) subsequent to a successful data transmission, wherein the terminal device does not transmit harvested energy status after it gets scheduled.

In some example embodiments, the means for reporting the energy harvesting capability may include means for reporting the energy harvesting capability if at least the following conditions are met: an amount of data stored in a buffer is ready to be transmitted from the terminal device, the first energy value exceeds the energy threshold value, the terminal device has not been barred from scheduling request or within the minimum time period (M), and the terminal device has not previously reported the energy harvesting capability at least in the last threshold period (K).

In some example embodiments, the means for reporting the energy harvesting capability may include means for reporting the energy harvesting capability to the network device via a radio resource control (RRC) signaling.

In some example embodiments, the means for reporting the energy harvesting capability may include means for obtaining a mapping using indices to indicate respective energy values; and means for reporting the energy harvesting capability with corresponding indices to the first and the second energy values.

In some example embodiments, the means for reporting the energy harvesting capability may include means for comparing the first energy value with a reference energy value previously received by the terminal device during the first time interval; and means for reporting the energy harvesting capability based on a parameter value associated with a comparison result.

In some example embodiments, the means for reporting the energy harvesting capability may include means for determining whether harvested energy at the terminal device satisfies an energy threshold value required for a reception of data transmission from the network device if a request for the energy harvesting capability from the network device is received, and means for reporting the energy harvesting capability if the harvested energy at terminal device satisfies the energy threshold value.

In some example embodiments, the apparatus may further include means for performing the data transmission using the one or more uplink scheduling grants, in accordance with a determination that harvested energy at the terminal device satisfies an energy threshold value required for the data transmission using the uplink scheduling grant.

In some example embodiments, the apparatus may further include means for abandoning the data transmission on the uplink scheduling grant, in case of the determination that the harvested energy at the terminal device does not satisfy the energy threshold value required for the data transmission; and means for reattempting transmitting the data on a subsequent uplink scheduling grant in the one or more uplink scheduling grants, in case of a further determination that the harvested energy at the terminal device satisfies the energy threshold value required for the data transmission.

In some example embodiments, the apparatus may further include means for transmitting, to the network device, a request for a re-allocation of the one or more uplink scheduling grants, in case of the determination that the harvested energy at the terminal device does not satisfy respective energy threshold values required for the data transmission.

In some example embodiments, the apparatus may include means for, when a request for the energy harvesting capability from the network device is received, determining whether harvested energy at the terminal device satisfies an energy threshold value required for a reception of data transmission from the network device; and means for reporting the energy harvesting capability information.

In some example embodiments, an apparatus capable of performing the method 500 (for example, implemented at the network device 120) may include means for performing the respective steps of the method 500. The means may be implemented in any suitable form. For example, the means may be implemented in a circuitry or software module.

In some example embodiments, the apparatus includes means for receiving, from a terminal device, energy harvesting capability of the terminal device indicating a first energy value collected during a first time interval and a second energy value averaged over a second time interval; and means for allocating, to the terminal device, scheduling information for a communication between the terminal device and the network device at least based on the energy harvesting capability of the terminal device.

In some example embodiments, the scheduling information includes one or more uplink scheduling grants or one or more downlink scheduling grants.

In some example embodiments, the second time interval is longer than the first time interval.

In some example embodiments, the apparatus may further include means for transmitting, to the terminal device, configuration information for the terminal device to compute the first and the second energy values.

In some example embodiments, the configuration information includes at least one of the first time interval ($\Delta t$), the second time interval, indicated as one of at least an absolute time interval or a value (e.g. N) relative to the first time interval (e.g., $N*\Delta t$), the energy threshold (T) value, or a threshold period (K) between reporting instances or a minimum time period (M) subsequent to a successful data transmission, wherein the terminal device does not transmit harvested energy status after it gets scheduled.

In some example embodiments, the means for receiving the energy harvesting capability may include means for receiving the energy harvesting capability via a radio resource control (RRC) signaling.

In some example embodiments, the apparatus may further include means for obtaining, from the energy harvesting capability, indices corresponding to the first and the second energy values; and means for determining the first and the second energy values based on the indices and a mapping using indices to indicate respective energy values.

In some example embodiments, the apparatus may further include means for obtaining from the energy harvesting information, a parameter value associated with a comparison result between the first energy value with a reference energy value previously collected by the terminal device during the first time interval; and means for determining the first energy value based on the parameter value associated with the comparison.

In some example embodiments, the apparatus may further include means for receiving, from the terminal device, capabilities profile information of the terminal device.

In some example embodiments, the apparatus may further include means for determining a scheduling priority for scheduling data transmission from the terminal device based on the first and the second energy values; and allocating the one or more uplink scheduling grants based on the scheduling priority.

In some example embodiments, the scheduling priority is determined based on the first and second energy values and respective weight control factors for the first and the second energy values.

In some example embodiments, the scheduling priority is determined based on the following:

$$SP = \frac{(\Delta E_t)^{w1}}{(E_{Avg})^{w2}} \quad (3)$$

where, $0 \leq w1 \leq 1$ and $0 \leq w2 \leq 1$ represent internal weighting parameters to control relative weightage of the first and the second energy values and $\Delta E_t$ and $E_{Avg}$ represent first and the second energy values, respectively.

In some example embodiments, the apparatus may further include means for obtaining, from the terminal device, the energy harvesting capability, a parameter value associated with a comparison result between the first energy value with a reference energy value previously collected by the terminal device during the first time interval; and determining the first energy value based on the parameter value associated with the comparison.

In some example embodiments, the apparatus may further include means for receiving, from the terminal device, capabilities profile information of the terminal device, prior to transmitting the configuration information to the terminal device.

In some example embodiments, the apparatus may further include means for receiving, from the terminal device, an amount of data stored in a buffer of the terminal device, or a request for a re-allocation of uplink scheduling grants.

In some example embodiments, the apparatus may further include means for transmitting a request for the energy harvesting capability to the terminal device; and determining one or more downlink scheduling grants for data transmission from the network device based on the energy harvesting capability received from the terminal device.

Figure 6:
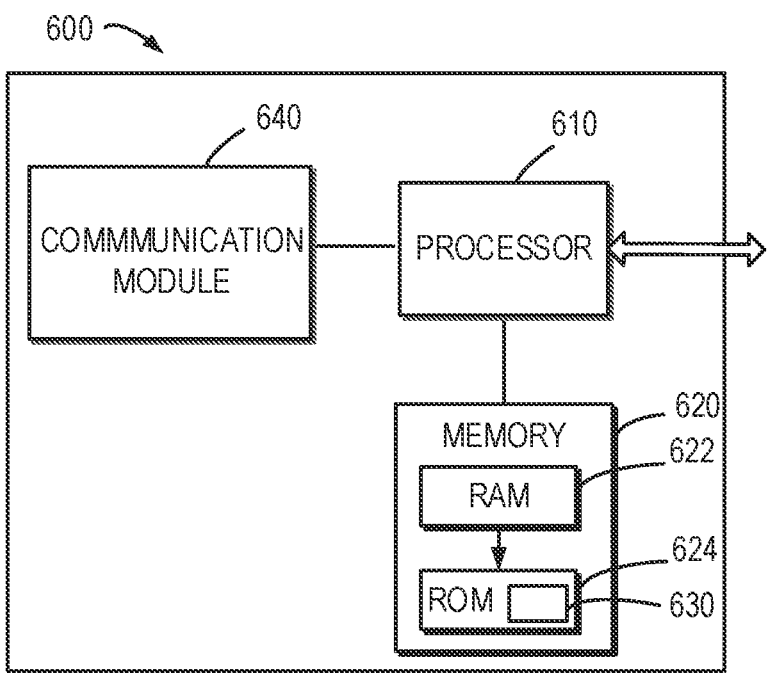
FIG. 6 shows a simplified block diagram of a device that may be suitable for implementing example embodiments of the present disclosure.

FIG. 6 is a simplified block diagram of a device 600 that is suitable for implementing example embodiments of the present disclosure. The device 600 may be provided to implement a communication device, for example, the terminal device 110 or the network device 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
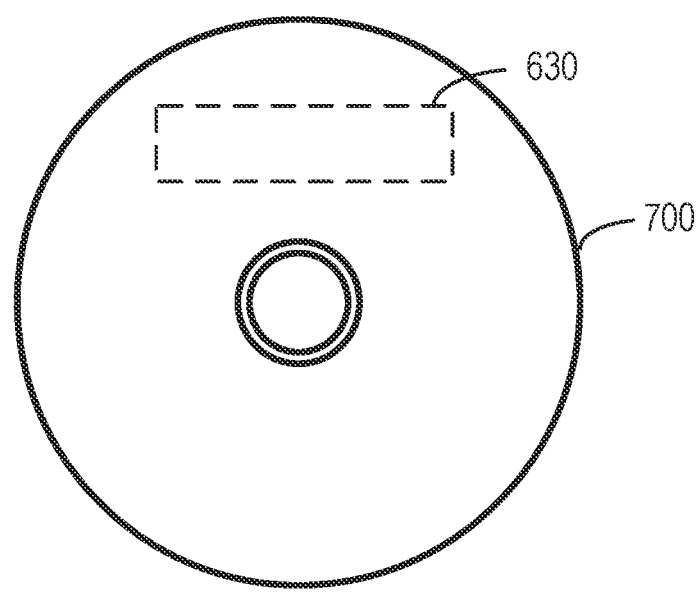
FIG. 7 shows a block diagram of an example computer readable medium in accordance with some embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

The invention claimed is:

1. A terminal device in a radio access network, comprising:
   at least one processor; and
   at least one memory storing instructions that, when executed by the at least one processor, cause the terminal device at least to:
   report, to a network device in the radio network, energy harvesting capability of the terminal device indicating a first energy value collected during a first time interval and a second energy value averaged over a second time interval; and
   communicate with the network device according to scheduling information received from the network device and determined based on the energy harvesting capability of the terminal device.

2. The terminal device of claim 1, wherein the terminal device is caused to:
   receive, from the network device, configuration information; and
   determine the first energy value ($\Delta E_t$) and the second energy value ($E_{Avg}$) using the configuration information.

3. The terminal device of claim 2, wherein the terminal device is caused to:
   transmit, capabilities profile information to the network device, prior to receiving the configuration information.

4. The terminal device of claim 2, wherein the configuration information comprises at least one of the following:
   the first time interval,
   the second time interval, indicated as an absolute time interval or multiples of the first time interval,
   an energy threshold (T) value,
   a threshold period (K) between reporting instances, or
   a minimum time period (M) subsequent to a successful data transmission, wherein the terminal device does not transmit harvested energy status after it gets scheduled.

5. The terminal device of claim 4, wherein the terminal device is caused to:
   report, to the network device, the energy harvesting capability of the terminal device if at least one or a combination of the following conditions are met:
   an amount of data stored in a buffer is ready to be transmitted from the terminal device,
   the first energy value exceeds the energy threshold value,
   the terminal device has not been barred from scheduling request or within the minimum time period (M), and
   the terminal device has not previously reported the energy harvesting capability at least in the last threshold period (K).

6. The terminal device of claim 1, wherein the terminal device is caused to:
   obtain a mapping using indices to indicate respective energy values; and
   report the energy harvesting capability with corresponding indices to the first and the second energy values.

7. The terminal device of claim 1, wherein the terminal device is caused to:
   compare the first energy value with a reference energy value previously received by the terminal device during the first time interval; and
   report the energy harvesting capability based on a parameter value associated with a comparison result.

8. The terminal device of claim 1, wherein the scheduling information comprises one or more uplink scheduling grants or one or more downlink scheduling grants, wherein the terminal device is caused to:
   perform data transmission using the one or more uplink scheduling grants, in accordance with a determination that harvested energy at the terminal device satisfies an energy threshold value required for the data transmission using the uplink scheduling grant.

9. The terminal device of claim 7, wherein the terminal device is caused to:
   abandon the data transmission on the uplink scheduling grant, in case of the determination that the harvested energy at the terminal device does not satisfy the energy threshold value required for the data transmission; and
   reattempt transmitting the data on a subsequent uplink scheduling grant in the one or more uplink scheduling grants, in case of a further determination that the harvested energy at the terminal device satisfies the energy threshold value required for the data transmission.

10. The terminal device of claim 8, wherein the terminal device is caused to:
    transmit, to the network device, a request for a re-allocation of the one or more uplink scheduling grants, in case of the determination that the harvested energy at the terminal device does not satisfy respective energy threshold values required for the data transmission.

11. The terminal device of claim 1, wherein the terminal device is caused to:
    when a request for the energy harvesting capability from the network device is received, determine whether harvested energy at the terminal device satisfies an energy threshold value required for a reception of data transmission from the network device; and
    report the energy harvesting capability information.

12. A network device comprising:
    at least one processor; and
    at least one memory storing instructions that, when executed by the at least one processor, cause the network device at least to:
    receive, from a terminal device, energy harvesting capability of the terminal device indicating a first energy value collected during a first time interval and a second energy value averaged over a second time interval; and
    allocate, to the terminal device, scheduling information for communication between the terminal device and the network device based on at least the energy harvesting capability of the terminal device.

13. The network device of claim 12, wherein the network device is caused to:
    transmit, to the terminal device, configuration information for the terminal device to compute the first and the second energy values.

14. The network device of claim 13, wherein the configuration information comprises at least one of the following:
    the first time interval,
    the second time interval, indicated as an absolute time interval or multiples of the first time interval,
    an energy threshold (T) value, a threshold period (K) between reporting instances, or a minimum time period (M) subsequent to a successful data transmission, wherein the terminal device does not transmit harvested energy status after it gets scheduled.

15. The network device of claim 12, wherein the network device is caused to:
   determine a scheduling priority for scheduling data transmission from the terminal device based on the first and the second energy values; and
   allocate or re-allocate the scheduling information based on the scheduling priority.

16. The network device of claim 14, wherein the scheduling priority is determined based on the first and second energy values and respective weight control factors for the first and the second energy values, and wherein the scheduling priority is determined based on the following:

$$SP = \frac{(\Delta E_t)^{w1}}{(E_{Avg})^{w2}}$$

where, $0 \leq w1 \leq 1$ and $0 \leq w2 \leq 1$ represent internal weighting parameters to control relative weightage of the first and the second energy values and $\Delta E_t$ and $E_{Avg}$ represent first and the second energy values, respectively.

17. The network device of claim 12, wherein the network device is caused to:
   obtain, from the terminal device, the energy harvesting capability, having indices corresponding to the first and the second energy values; and
   determine the first and the second energy values based on the indices and a mapping using indices to indicate respective energy values.

18. The network device of claim 12, wherein the network device is caused to:
   obtain, from the terminal device, the energy harvesting capability, a parameter value associated with a comparison result between the first energy value with a reference energy value previously collected by the terminal device during the first time interval; and
   determine the first energy value based on the parameter value associated with the comparison.

19. The network device of claim 12, wherein the network device is caused to:
   receive, from the terminal device,
      an amount of data stored in a buffer of the terminal device; or
      a request for a re-allocation of uplink scheduling grants.

20. The network device of claim 12, wherein the network device is caused to:
   transmit a request for the energy harvesting capability to the terminal device; and
   determine one or more downlink scheduling grants to the terminal device for data transmission from the network device based on the energy harvesting capability received from the terminal device.

* * * * *